United States Patent [19]

Gartenberg et al.

[11] Patent Number: 5,491,334
[45] Date of Patent: Feb. 13, 1996

[54] MAGNETO-OPTICAL INPUT SYSTEM FOR INFRARED DETECTORS

[75] Inventors: Alvin Gartenberg, Dix Hills; David I. Durst, Syosset, both of N.Y.

[73] Assignee: Grumman Aerospace Corporation, Bethpage, N.Y.

[21] Appl. No.: 294,724

[22] Filed: Aug. 22, 1994

[51] Int. Cl.$^6$ .................. G01J 1/04; G01J 5/00
[52] U.S. Cl. ............ 250/227.21; 250/338.1; 250/352
[58] Field of Search ............ 250/225, 227.21, 250/227.23, 352, 338.1, 338.2; 359/280; 365/122

[56] References Cited

U.S. PATENT DOCUMENTS

| | | | |
|---|---|---|---|
| 3,819,944 | 6/1974 | Lacklison et al. | 250/338.2 |
| 4,152,595 | 5/1979 | Garfinkle et al. | 307/350 |
| 4,179,691 | 12/1979 | Keller | 340/567 |
| 4,243,885 | 1/1981 | Agouridis et al., | 250/370 |
| 4,255,658 | 3/1981 | Hurst | 250/332 |
| 4,257,057 | 3/1981 | Cheung et al. | 357/34 |
| 4,303,861 | 12/1981 | Ekstrom | 250/370 |
| 4,338,627 | 7/1982 | Stapleton | 358/113 |
| 4,418,335 | 11/1983 | Genahr | 340/565 |
| 4,423,325 | 12/1983 | Foss | 250/332 |
| 4,431,920 | 2/1984 | Spour et al. | 250/370 |
| 4,435,652 | 3/1984 | Stevens | 307/297 |
| 4,496,854 | 1/1985 | Chi et al. | 357/5 |
| 4,499,416 | 2/1985 | Koike | 323/303 |
| 4,633,086 | 12/1986 | Parrish | 250/338 |
| 4,647,778 | 3/1987 | Kline et al. | 250/352 |
| 4,810,978 | 3/1989 | Sato et al. | 332/7.51 |
| 4,864,237 | 9/1989 | Hoenig | 307/306 |
| 4,875,010 | 10/1989 | Yokosawa et al. | 324/248 |
| 5,118,946 | 6/1992 | Smith | 250/352 |
| 5,126,568 | 6/1992 | Durst | 250/338.1 |
| 5,298,755 | 3/1994 | Wuest et al. | 250/374 |

FOREIGN PATENT DOCUMENTS

| | | |
|---|---|---|
| 233840 | 2/1990 | Japan . |
| 29781 | of 1991 | Japan . |

*Primary Examiner*—Stephone B. Allen
*Attorney, Agent, or Firm*—Stetina Brunda & Buyan

[57] ABSTRACT

A detector interface system communicates signals between an infrared detector element maintained in a cryogenic environment and associated signal processing circuitry maintained in a non-cryogenic environment. An optical modulator disposed within the cryogenic environment in electrical communication with the infrared detector element converts the electrical output of the infrared detector element into an optical output signal representative thereof. An optical demodulator disposed in the non-cryogenic environment converts the optical output signal of the optical modulator into an electrical signal. The optical demodulator is an electrical communication with the signal processing circuitry. An optical path from the optical modulator to the optical demodulator provides thermal isolation between the infrared detector element and its associated signal processing circuitry and minimizes detector bias so as to mitigate 1/f noise.

20 Claims, 1 Drawing Sheet

MAGNETO-OPTICAL INPUT SYSTEM FOR INFRARED DETECTORS

FIELD OF THE INVENTION

The present invention relates generally to infrared detector input circuits and more particularly to a circuit for communicating signals from infrared detector elements to signal processing circuitry which is electrically and thermally isolated from the infrared detector elements.

BACKGROUND OF THE INVENTION

The infrared spectrum covers a range of wavelengths longer than the visible wavelengths but shorter than microwave wavelengths. Visible wavelengths are generally regarded as between 0.4 and 0.75 micrometers. The near infrared wavelengths extend from 0.75 micrometers to 10 micrometers. The far infrared wavelengths cover the range from approximately 10 micrometers to 1 millimeter. The function of infrared detectors is to respond to energy of a wavelength within some particular portion of the infrared region.

Heated objects dissipate thermal energy having characteristic wavelengths within the infrared spectrum. Different levels of thermal energy, corresponding to different sources of heat, are characterized by the emission of signals within different portions of the infrared frequency spectrum. No single detector is uniformly efficient over the entire infrared frequency spectrum. Thus, detectors are selected in accordance with their sensitivity in the range of interest to the designer. Similarly, electronic circuitry that receives and processes the signals from the infrared detector must also be selected in view of the intended detection function.

A variety of different types of infrared detectors have been proposed in the art since the first crude infrared detector was constructed in the early 1800's. Virtually all contemporary infrared detectors are solid state devices constructed of materials that respond to infrared frequency energy in one of several ways. Thermal detectors respond to infrared frequency energy by absorbing that energy, thereby causing an increase in temperature of the detecting material. The increased temperature in turn causes some other property of the material, such as resistivity, to change. By measuring this change, the infrared radiation is measured.

Photo-type detectors (e.g., photoconductive and photovoltaic detectors) absorb the infrared frequency energy directly into the electronic structure of the material, inducing an electronic transition which, in turn, leads to either a change in the electrical conductivity (photoconductors) or to the generation of an output voltage across the terminals of the detector (photovoltaic detectors). The precise change that is effected is a function of various factors including the particular detector material selected, the doping density of that material, and the detector area.

By the late 1800's, infrared detectors had been developed that could detect the heat from an animal at one quarter of a mile. The introduction of a focusing lens constructed of materials transparent to infrared frequency energy, as well as advances in semiconductor materials and highly sensitive electronic circuity have advanced the performance of contemporary infrared detectors close to the ideal photon limit.

Current infrared detection systems incorporate arrays of large numbers of discrete, highly sensitive detector elements, the outputs of which are connected to sophisticated processing circuitry. By rapidly analyzing the pattern and sequence of detector element excitations, the processing circuitry can identify and monitor sources of infrared radiation. Though the theoretical performance of such systems is satisfactory for many applications, it is difficult to actually construct structures that mate a million or more detector elements and associated circuitry in a reliable and practical manner. Consequently, practical applications for contemporary infrared detection systems have necessitated that further advances be made in areas such as miniaturization of the detector array and accompanying circuitry, minimization of noise intermixed with the electrical signal generated by the detector elements, and the reliability and economical production of the detector array and accompanying circuitry.

The outputs of the detectors must undergo a series of processing steps in order to permit derivation of the desired information. The more fundamental processing steps include preamplification, tuned bandpass filtering, clutter and background rejection, multiplexing and fixed noise pattern suppression.

Limitations on the performance of contemporary infrared detectors arise due to the presence of noise intermixed with the signal generated by the detector. This is particularly true when noise is introduced into the signal prior to preamplification of the signal. In general, such noise may be a consequence of background conditions at the site of the detector, generated from within the detector itself, or generated as a consequence of the interconnected electronic circuitry. Unless eliminated from the detected signal, noise components establish the minimum level of detectivity obtainable from the detection circuit.

Cooling the detector to extremely low temperatures, i.e., cryogenic temperatures, is effective to reduce random electronic activity within the detector and therefore reduce some components of the noise spectrum. Filters and well-known electronic signal processing techniques are also effective to reduce background noise levels, permitting enhancement of the signal-to-noise ratio of the detector circuit.

It is necessary to isolate the detectors from their associated signal processing circuitry so as to maintain such cryogenic temperatures. As those skilled in the art will appreciate, signal processing circuitry, as well as any other electronic circuitry, would tend to increase the temperature of the infrared detectors. Thus, it is desirable to thermally isolate infrared detectors from any electronic circuitry.

One type of noise that is particularly significant when the detector operates in certain regions of the infrared frequency spectrum is commonly referred to as flicker noise, or 1/f noise. The term 1/f noise generally refers to noise in the semiconductor detector that is due to modulation of the detector conductivity. 1/f noise increases dramatically as the biasing voltage across the detector increases. Because 1/f noise can be the principal noise component at certain frequencies of operation, it is highly desirable that the detector bias voltage be reduced as much as possible while retaining high gain and low power levels in the detector circuit.

Although prior art circuits have been proposed that provide zero bias voltage across the infrared detector to reduce 1/f noise, those circuits suffer from one or more common deficiencies. One of those deficiencies concerns the ability of the circuit to achieve the desired operating point, i.e., the zero bias condition, and to maintain that desired operating point over time. Another deficiency concerns the ability of the circuit to achieve the desired operating point uniformly over a large number of inputs, despite differences in the threshold levels of the particular semiconductors incorporated into the circuit. Variations with regard to those threshold levels, as well as variations in the precise resistance of other components may change the operating conditions such that maximum reduction of noise levels is not consistently obtainable without persistent measurements and adjustments.

Another deficiency of contemporary zero biasing circuits relates to the intrinsic topology of the of the buffer circuits that are interconnected to the detectors. Ideally buffer circuits should operate at very small signal levels and therefore generate discernable output signals upon the application of a small signal upon the gate of the device. Thus, power consumption and power dissipation requirements should be minimized without sacrificing sensitivity to low level inputs. Some existing buffer circuits incorporate semiconductor devices such as bipolar transistors, which suffer from the requirement that too large a current must be applied to the base thereof in order to turn on the circuit. Thus, sensitivity is reduced in such buffer circuits. Other circuits that incorporate devices operating in a normally on condition, i.e., above threshold, may draw too much current when activated by a signal responsive to irradiation of the detector, thereby undesirably raising the bias voltage on the detector.

Contemporary zero biasing circuits typically function by first sensing a drift in the bias, which results in a non-zero bias, and then correcting the non-zero bias condition. Therefore, a non-zero bias condition exists momentarily prior to the correction. This results in a time variation of the detector bias and consequently generation of a 1/f noise component. Bias voltages are continuously applied to the detector element by signal processing circuitry and these bias voltages are continuously compensated for by the contemporary zero biasing circuits.

The electronic interface circuitry utilized in contemporary infrared focal plane arrays must transform extremely minute infrared detector signal current into usable voltages. The output of contemporary infrared detector elements is typically less than 0.01 picoamps. Thus, the process of converting the current output of the infrared detector elements into such a usable voltage is very susceptible to noise. The amount of susceptibility to noise is substantially dependent upon the input characteristics of the transimpedance amplifier (TIA) utilized. The TIA is also required to operate at extremely low power levels so that the infrared detectors can easily be cooled so as to facilitate their operation at cryogenic temperatures as discussed above.

The input impedance of the TIA must be as low as possible such that a substantial portion of the infrared detector current output flows into the TIA rather than being shunted across the infrared detector element's own impedance. Such construction thus maximizes the input circuits injection efficiency. Longer wavelength infrared detectors and detectors operated at warmer than normal temperatures further require particularly low input impedance TIA's.

In order to obtain good system sensitivity, both the noise level of the TIA and the noise level of the infrared detector must be minimized. As mentioned above, one of the major components of detector noise is 1/f noise, which is strongly dependent upon detector bias. The TIA input circuitry must thus maintain the infrared detector bias as close to 0 volts as possible. In many applications, bias voltages exceeding several hundred microvolts can cause unacceptably high 1/f noise.

Furthermore, coupling of the output signal from the comparatively cold cryogenic focal plane to a comparatively warmer area wherein signal processing circuitry is disposed requires a low noise, signal preserving path which maintains the required high degree of thermal isolation. The need for a low noise, signal preserving path and a high degree of thermal isolation present conflicting requirements. The long path lengths necessary to improve thermal isolation are in contradiction to the short path lengths which are substantially less susceptible to noise and distortion.

Typical approaches to resolving this conflict include converting the analog detector signal into a digital signal utilizing an analog-to-digital converter followed by a fiber optic interface for communicating the detector output signal to the warmer signal processing circuitry. The optical fiber maintains the required thermal isolation while substantially reducing susceptibility to electrical interference. The penalty is high-powered dissipation and quantizing noise associated with the analog-to-digital converter and the high-power dissipation of the active fiber optic driver.

Examples of prior art input circuits which receive the output of an infrared detector element and transmit a signal representative thereof to signal processing circuitry are provided in U.S. Pat. Nos. 5,118,946 and 5,126,568. U.S. Pat. No. 5,118,946 discloses optical coupling of an infrared detector element to signal processing circuitry. U.S. Pat. No. 5,126,568 discloses magnetic coupling of an infrared detector element to signal processing circuitry. In both U.S. Pat. No. 5,118,946 and U.S. Pat. No. 5,126,568, various components, such as amplifiers, are located upon the focal plane so as to facilitate the transmission of a signal representative of the infrared detector element output to signal processing circuitry. However, such components inherently radiate heat, thereby undesirably tending to raise the temperature of the infrared detector elements and thus increasing 1/f noise.

As such, although the prior art has recognized to a limited extent the problems of thermal isolation and the generation of 1/f noise due to bias voltages generated by signal processing circuitry, the proposed solutions have to date been ineffective in providing a satisfactory remedy. In view of the shortcomings of the prior art, it is desirable to provide an input circuit which isolates the detector element from both heat and the bias voltage generated by signal processing circuitry so as to reduce 1/f noise.

SUMMARY OF THE INVENTION

The present invention specifically addresses and alleviates the above-mentioned deficiencies associated with the prior art. More particularly, the present invention generally comprises a detector interface system for communicating signals between an infrared detector element maintained in a comparatively lower temperature cryogenic environment and associated signal processing circuitry maintained in a comparatively higher temperature non-cryogenic environment. The detector interface system comprises an optical modulator disposed in the cryogenic environment in electrical communication with the infrared detector element for converting the electrical output of the infrared detector element into an optical output signal representative thereof and an optical demodulator disposed in the non-cryogenic environment in optical communication with the optical modulator for converting the optical output signal of the optical modulator into an electrical signal representative thereof. The optical demodulator is in electrical communication with the signal processing circuitry so as to provide an electrical signal representative of the infrared detector element output thereto.

As used herein, the term cryogenic environment is defined to include any comparatively lower temperature environment and the term non-cryogenic environment is defined to include any comparatively higher temperature environment, regardless of the actual temperatures of the two environments and regardless of any means or lack thereof for maintaining the temperature of the environments. Thus, although the temperature of a cryogenic environment is frequently maintained at a given level, according to the definition thereof provided herein the temperature of the cryogenic environment may either be maintained at a desired coparatively low temperature or allowed to assume a comparatively low temperature on its own. It is only important that the temperature of the cryogenic environment be lower than the temperature of the non-cryogenic environment.

Thus, an optical path extends from the optical modulator to the optional demodulator for facilitating optical communication therebetween. The optical path provides thermal isolation between the infrared detector and its associated signal processing circuitry while also minimizing detector bias so as to mitigate 1/f noise.

The optical modulator preferably comprises a first magneto-optical modulator and the optical demodulator preferably comprises a second magneto-optical modulator. Each magneto-optical modulator preferably comprises a multi-turn helical coil of wire wound around a ferromagnetic magneto-optical rod. The magneto-optical rod preferably comprises gallium doped YAG.

The magneto-optical modulator is in direct electrical communication with the infrared detector element. That is, no electrical components, i.e., resistors, capacitors, inductors, transistors, amplifiers, integrated circuits, etc., are electrically connected intermediate the infrared detector element and the magneto-optical modulator. Thus, the output of the infrared detector element is conducted directly to the magneto-optical modulator. Such direct connection of the infrared detector to the magneto-optical modulator minimizes the generation of heat within the cryogenic environment, as would occur if the output of the infrared detector element were to be conducted through any electrical components. Only conductive conduits are thus provided between the infrared detector element and the magneto-optical modulator.

The optical demodulator preferably comprises a controllable current source in electrical communication with the second magneto-optical modulator so as to effect further modulation of an optical signal communicated from said first magneto-optical modulator and also comprises an optical sensor for determining a given state of modulation of the optical signal. The optical signal is demodulated by determining the amount of current required to change the modulation of the signal to a given state of modulation.

More particularly, the optical modulator preferably modulates polarization of the optical output signal thereof and the optical demodulator then senses polarization of the optical output signal of the optical modulator. Sensing of the polarization of the optical output signal of the optical modulator is preferably accomplished by utilizing a feedback servo loop configured to rotate the optical output signal of the optical modulator to a cross-polarized null of the optical sensor.

Thus, the optical sensor preferably comprises a polarization filter and a photo-electric detector such that the output of the photo-electric detector is substantially zero when the polarization plane of the optical output signal of the optical modulator is perpendicular to the polarization plane of the optical filter, thus defining a cross-polarized null which is easily detectable.

The demodulator thus determines the polarization angle of the modulated optical output signal of the optical modulator by determining the angle by which the optical output signal must be rotated in order to be aligned at the cross-polarized null of the optical sensor. The angle by which the optical output signal must be so rotated is representative of the angle to which the optical output signal was modulated by the modulator, and is consequently likewise representative of the infrared detector element output utilized to modulate the optical output signal.

The direct conversion of an infrared detector element output signal current into a modulated fiber optic signal has several advantages. The optical fiber coupling infrared detectors at cryogenic temperatures to warmer signal processing circuitry maintains a high degree of thermal isolation therebetween. Such coupling is additionally substantially impervious to electrical interference.

Furthermore, the direct conversion of the detector signal current into a magnetic field which is used modulate the light coupled into the optical fiber is a completely passive process which does not dissipate substantial power within the cryogenic environment. The conversion of signal current into a magnetic field can be accomplished via multiple turns of wire formed into a helical coil having very low DC resistance. This both maintains a very high injection efficiency and forces a detector bias voltage to 0 volts so as to minimize 1/f noise.

Thus, the magneto-optical modulator is comprised of a multi-turn helical coil of wire wound around a ferromagnetic magneto-optical rod, preferably comprised of gallium doped YAG. The coil is wrapped around the ferromagnetic magneto-optical rod so as to produce a magnetic field axially along the length of the ferromagnetic magneto-optical rod. The infrared detector element is electrically connected in series with the multi-turn helical coil. Thus, the current generated by the infrared detector element in response to excitation by infrared radiation generates a magnetic field within the ferromagnetic magneto-optical rod which is proportional to the magnitude of the current and the number turns of wire in the coil.

In the presence of such a magnetic field, the gallium doped YAG ferromagnetic magneto-optical rod becomes optically active. As discovered by Faraday, the plane of polarization of plane-polarized light is rotated through an angle $\theta$ when transmitted through an optically active material in a direction parallel to a magnetic field. Plane-polarized light introduced into one end of the rod, which is preferably an element of an optical fiber, experiences rotation of its polarization proportional to the magnitude of the axial magnetic field. Since the field strength is, in turn, proportional to the optically induced current flowing from the infrared detector element, the polarization angle of the output signal, i.e., the modulated laser light, is modulated by the light or infrared radiation falling on the photodetector.

The amount of rotation is given by:

$$\theta = V \cdot H \cdot l$$

where:

V=Verdet constant

H=magnetic field strength l=interaction length

The Verdet constant is defined as the rotation per unit path length per unit field strength. In general, the sign of the Verdet constant is positive for diamagnetic materials and negative for paramagnetic and ferromagnetic materials.

The direction of rotation of the polarization plane follows the direction of current flow in the surrounding coil. Therefore, the direction of rotation is the same for light passing in the opposite direction. Therefore, the rotational effect can be multiplied by reflecting light back and forth multiple times within the substance.

In order to utilize the modulation effect, means must be provided to measure the angular deviation of the polarization plane of the output light. As mentioned above, one approach is to have the output light pass through the demodulator which comprises a Faraday rotator or second modulator which is driven or controlled by a variable current source. The current required to rotate the polarization back to its equilibrium value is measured and is proportional to the infrared detector output current. This process may be accomplished utilizing a feedback servo loop designed to rotate the output light to a cross-polarized null as discussed above, for example.

The method and apparatus of the present invention may thus be utilized to convert low level signal currents from a cryogenic photodetector into an optical signal without the need for further amplification or thermally conductive wires connected to warmer surroundings. The present invention may also be utilized to monitor signals from any current producing transducer without the need for electrically conductive wiring. Furthermore, the present invention may be utilized to monitor signal currents in an electromagnetically hostile environment without corrupting the signal.

Additionally, the method and apparatus of the present invention facilitate the maintenance of a desired low temperature proximate the infrared detector elements upon the focal plane. Facilitation of the desired low temperature is accomplished by eliminating electrical components which would otherwise radiate heat into the cryogenic environment of the focal plane. The elimination of such other components is facilitated by the use of an optical modulator which is capable of modulating an optical signal utilizing only the direct output of an infrared detector element; amplification and other signal processing of the output of the infrared detector element prior to modulation of the optical signal is not required.

These, as well as other advantages of the present invention will be more apparent from the following description and drawings. It is understood that changes in the specific structure shown and described may be made within the scope of the claims found departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The magneto-optical input system of the present invention is illustrated in FIGS. 1–4 which depict a presently preferred embodiment of the invention.

Figure 1:
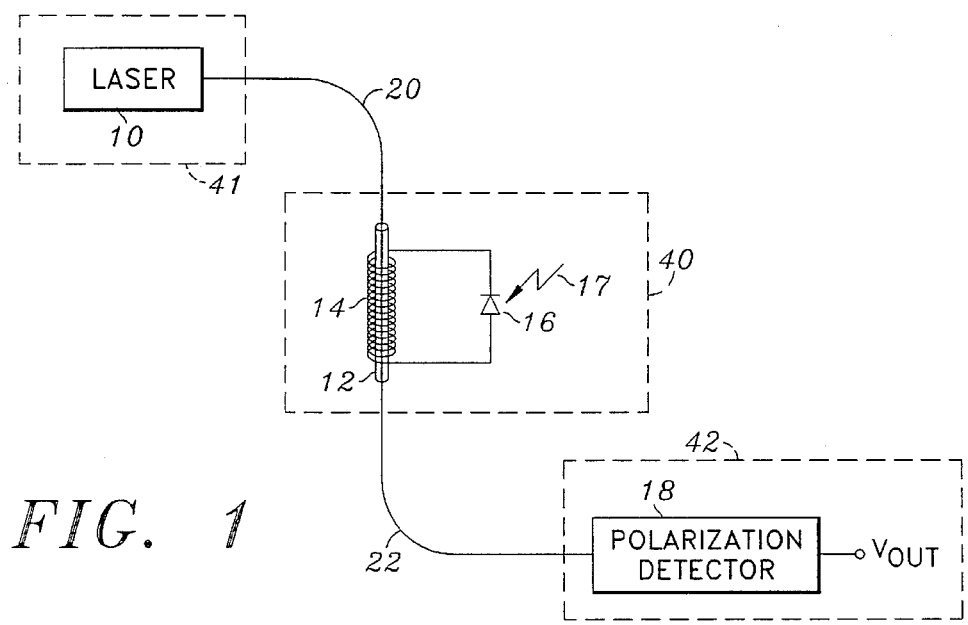
FIG. 1 is a schematic representation of the magneto-optical input system of the present invention.
Figure 2:
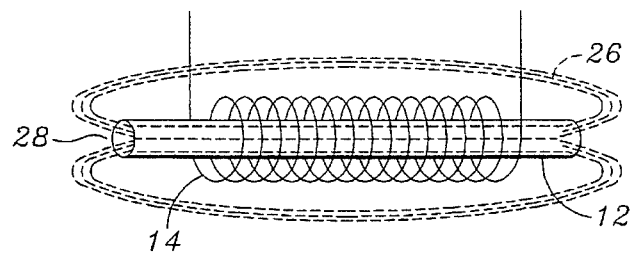
FIG. 2 is an enlarged perspective view of the magneto-optical rod showing the coiled wire formed thereabout and the magnetic flux formed axially therewithin.

Referring now to FIGS. 1 and 2, in the preferred embodiment of the present invention the magneto-optical input system is comprised generally of a laser 10, a gallium doped YAG rod 12 having a multi-turn helical coil of wire 14 wound thereabout, and a polarization detector 18. The gallium doped YAG rod 12 having the multi-helical coil 14 wound thereabout, comprises an optical modulator. The polarization detector 18 defines an optical demodulator.

The gallium doped YAG rod 12 and the multi-turn helical coil 14 formed thereabout, along with the infrared detector element 16 are all disposed within a cryogenic environment 40, so as to minimize the generation of noise within the infrared detector element 16 and its associated electronic circuitry. The laser 10 and the polarization detector 18 are both disposed in warmer areas 41 and 42, respectively, outside of the cryogenic environment 40. Optical fiber cable 20 optically interconnects the laser 10 and the gallium doped YAG rod 12, and thus extends from the non-cryogenic or warmer area 41 to the cryogenic area 40. Fiberoptic cable 22 similarly interconnects the gallium doped YAG rod 12 and the polarization detector 18 and extends between the cryogenic area 40 and the non-cryogenic or area 42.

The infrared detector element 16 is connected in series with the multi-turn helical coil 14 such that electrical current produced thereby in response to incident infrared radiation 17 is conducted through the multi-turn helical coil 14 so as to induce a magnetic field axially within the gallium doped YAG rod 12.

With particular reference to FIG. 2, the current conducted through the multi-turn helical coil 14 thus induces a magnetic field 26 along the longitudinal axis of the magneto-optical rod 12, parallel to the optical axis thereof.

The magnetic field 26 induced by the multi-turn helical coil 14 causes the ferromagnetic magneto-optical rod 12 to become optically active. As discussed above, the plane of polarization of the plane-polarized light output by the laser 10 is rotated through an angle when transmitted therethrough.

The polarization detector 18 of the demodulator preferably comprises a second magneto-optical modulator and a controllable current source configured to apply a variable known current to the multi-turn helical coil of a second magneto-optical rod (not shown) thereof. A polarization filter and a detector are disposed at the output end of the second magneto-optical modulator.

Thus, a current is applied to the multi-turn helical coil of the second magneto-optical modulator in a manner which causes the polarized light output thereof to rotate its polarization angle to a polarization which is perpendicular to that of the polarization filter, thereby providing an easily identifiable null condition wherein substantially none of light output by the second magneto-optical modulator passes through the polarization filter. The voltage output of the demodulator's sensor is thus minimal when such a null condition is achieved.

The polarization angle of the modulated light signal is easily determined since it is proportional to the amount of current required to rotate the polarization angle thereof to the null condition. Thus, the amount of current required to achieve such a null condition is also proportional to the electrical output signal of the infrared detector 16.

Figure 3:
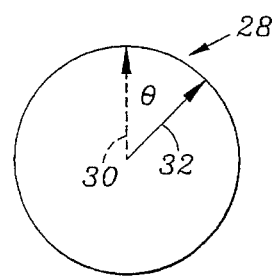
FIG. 3 is an end-view of the magneto-optical rod of FIG. 2 showing how the angle of polarization is varied by an amount θ which is proportional to the output of the infrared detector element wherein an initial or cross-polarized null is indicated by a dashed arrow and a modulated polarization is indicated by a solid arrow.

Having described the structure of the detector interface system of the present invention, it may be beneficial to describe the operation thereof. Referring now to FIGS. 1 and 3, the laser 10 provides a plane polarized output such that light is communicated through first optical fiber 20 and enters the first magneto-optical rod at a first polarization angle 30. The magnetic field 26 which is axially disposed within the first magneto-optical rod 12 causes the angle of polarization of the light entering the first magneto-optical rod 14 from the laser 10 to rotate through an angle θ to a second polarization angle 32 according to the formula: θ=V·Hl, as discussed above. Thus, the angle of rotation θ of the polarized light of the laser 10 is proportional to the current output of the infrared detector element 16, which is proportional to the quantity of infrared radiation 17 incident upon the infrared detector element 16.

Figure 4:
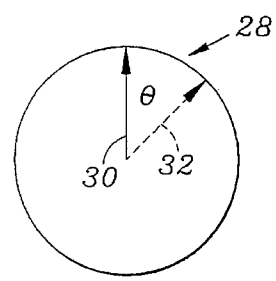
FIG. 4 is an end-view of the magneto-optical rod of FIG. 2 showing the angle of polarization changed by an amount θ proportional to the current applied by the demodulator so as to bring the plane of polarization back to its null position.

Referring now to FIG. 4, the light whose polarization angle has been rotated by the first magneto-optical rod 12 is then transmitted via optical fiber 22 from the first magneto-optical rod 12 to a polarization detector 18. The polarization detector preferably comprises a second magneto-optical rod (not shown). Current is applied to the multi-turn helical coil of the second magnetic-optical rod so as to cause the light to rotate back to its original or null position 30 as measured by an optical sensor and polarization filter (not shown).

The filter of the polarization detector 18 is preferably oriented such that when no infrared radiation 17 is incident upon the infrared detector element 16, a null condition is achieved. Thus, the polarization filter of the polarization detector 18 is oriented such that it is perpendicular to the polarization axis of the light input thereto from the first magneto-optical rod 12 such that minimal light is incident upon the sensor, thereby causing $V_{out}$ to be at its miniman level when no infrared radiation 17 is sensed by infrared detector element 16.

Infrared radiation 17 incident upon the infrared detector element 16 causes the plane of polarization to rotate away from the null orientation thereof at the polarization detector 18. Such rotation of the polarization angle is preferably then countered by applying current to the multi-turn helical coil of the second magneto-optical rod via a feedback servo system so as to cause the polarization angle to become realigned to its null position 30. The amount of current necessary to cause such realignment of the polarization angle of the light within the polarization detector 18 is thus proportional to the quantity of infrared radiation 17 incident upon the infrared detector element 16.

The magnetic-optical input system of the present invention thus provides direct coupling of the output of a photodetector to a passive wire coil so as to create a magnetic field that is used to modulate the polarization of light propagating through an optical device. This technique is totally passive, i.e., dissipates minimal power, and thus minimized the detector bias voltage so as to reduce 1/f noise and thereby maximize injector efficiency. The present invention facilitates modulating a property of the light conducted on an optical fiber directly from the output of a current producing signal source without the need active amplification. The modulation of the angle of polarization of the resulting output is measured or demodulated by using a feedback servo system which is designed to maintain the output polarization invariant.

It is understood that the exemplary magneto-optical input system of the present invention described herein and shown in the drawings represents only a presently preferred embodiment of the invention. Indeed, various modifications and additions may be made to such embodiments without departing from the spirit and scope of the invention. For example, various different types of demodulators are contemplated. It is only important that the angle of polarization of the signal to be demodulated be measured. Those skilled in the art will appreciate that various means for determining angle of polarization are suitable. Also, various sources of polarized light other than lasers are likewise contemplated. Thus, these and other modifications and additions may be obvious to those skilled in the art and may be implemented to adapt the present invention for use in a variety of different applications.

What is claimed is:

1. An input circuit for receiving an output of an infrared detector element maintained in a comparatively lower temperature environment and communicating that output to associated signal processing circuitry maintained in a comparatively higher temperature environment, the infrared detector element having an electrical output thereof, the input circuit comprising:

a) a magneto-optical modulator disposed in the comparatively lower temperature environment and in direct electrical communication with the infrared detector element, said magneto-optical modulator providing an optical output to communicate a signal representative of the electrical output of said infrared detector element to the signal processing circuitry in a noise-resistant manner; and b) wherein placing said magneto-optical modulator in direct electrical communication with the infrared detector element minimizes heat generation in the comparatively lower temperature environment so as to mitigate 1/f noise.

2. The input circuit as recited in claim 1 wherein said magneto-optical modulator modulates polarization of the optical output signal thereof.

3. The input circuit as recited in claim 1 wherein said magneto-optical modulator comprises a multi-turn helical coil of wire wound around a ferromagnetic magneto-optical rod.

4. The input circuit as recited in claim 3 wherein said ferromagnetic magneto-optical rod comprises gallium doped YAG.

5. A detector interface system for communicating signals between an infrared detector element maintained in a comparatively lower temperature environment and associated signal processing circuitry maintained in a comparatively higher temperature environment, the infrared detector element having an electrical output thereof, the detector interface system comprising:

a) an optical modulator disposed in the comparatively lower temperature environment in electrical communication with the infrared detector element for converting the electrical output of the infrared detector element into an optical output signal representative thereof;

b) an optical demodulator disposed in the comparatively higher temperature environment for converting the optical output signal of the optical modulator into an electrical signal representative thereof, said optical demodulator being in electrical communication with the signal processing circuitry; and c) an optical path from said optical modulator to said optical demodulator for facilitating optical communication therebetween;

d) wherein said optical path provides thermal isolation between the infrared detector element and signal processing circuitry and direct connection of the infrared detector element to the optical modulator mitigates 1/f noise.

6. The detector interface system as recited in claim 5 wherein:

a) said optical modulator comprises a first magneto-optical modulator; and b) said optical demodulator comprises a second magneto-optical modulator.

7. The detector interface system as recited in claim 6 wherein at least one of said first and second magneto-optical modulators comprise a multi-turn helical coil of wire wound around a ferromagnetic magneto-optical rod.

8. The detector interface system as recited in claim 6 wherein said optical demodulator further comprises:

a) a current source in electrical communication with said second magneto-optical modulator so as to effect modulation of an optical signal communicated from said first magneto-optical modulator thereto; and b) an optical sensor for determining a given state of modulation of the optical signal;

c) wherein the optical signal is demodulated by determining the amount of current required to change the modulation of the optical signal to the given state of modulation, 9. The detector interface system as recited in claim 8 wherein said optical sensor comprises a polarization filter and a photoelectric detector.

10. The detector interface system as recited in claim 9 wherein said optical demodulator further comprises a feedback servo loop configured to rotate the optical output signal of said optical modulator to a cross-polarized null of said optical sensor.

11. The detector interface system as recited in claim 7 wherein said ferromagnetic magneto-optical rod(s) comprise gallium doped YAG.

12. The detector interface system as recited in claim 5 wherein:

a) said optical modulator modulates polarization of the optical output signal thereof; and b) said optical demodulator senses polarization of the optical output signal of said optical modulator.

13. The detector interface system as recited in claim 5 wherein said optical path comprises at least one optical fiber.

14. The detector interface system as recited in claim 5 further comprising a laser disposed in the comparatively lower temperature environment, said laser providing plane polarized light to said optical modulator.

15. A method for communicating signals between an infrared detector element maintained in a comparatively lower temperature environment and associated signal processing circuitry maintained in a comparatively higher temperature environment, the infrared detector element having an electrical output, the method comprising the steps of:

a) converting the electrical output of the infrared detector element into an optical output signal representative thereof via a magneto-optical modulator, said converting being performed within the comparatively lower temperature environment;

b) transmitting the optical output signal from the comparatively lower temperature environment to the comparatively higher temperature environment; and c) converting the optical output signal into an electrical signal representative thereof, said converting being performed within the comparatively higher temperature environment.

16. The method as recited in claim 15 wherein the step of converting the electrical output of the infrared detector element into an optical output signal representative thereof comprises converting the electrical output of the infrared detector element into an optical output signal via a magneto-optical modulator comprising a ferromagnetic magneto-optical rod.

17. A method for facilitating the maintenance of a desired low temperature of an infrared detector element, the infrared detector element having an output, said method comprising the steps of:

a) electrically communicating the output of the infrared detector element directly from the infrared detector element to a magneto-optical modulator;

b) modulating the output of the magneto-optical modulator to provide an optical output representative of the electrical output of the infrared detector element; and c) communicating the optical output of the magneto-optical modulator to signal processing circuitry disposed remotely from the infrared detector element;

d) wherein electrically communicating the output of the infrared detector element directly from the infrared detector element to the magneto-optical modulator minimizes heat generation proximate the infrared detector element.

18. The method recited in claim 17 wherein the step of modulating the output of the magneto-optical modulator comprises modulating the polarization of the optical output of the magneto-optical modulator.

19. The method as recited in claim 17 wherein the step of electrically communicating the output of the infrared detector element directly from the infrared detector element to the magnetic-optical modulator comprises communicating the output of the infrared detector element directly from the infrared detector element to a multi-turn helical coil of wire wound around a ferromagnetic magneto-optical rod.

20. The method as recited in claim 17 wherein the step of electrically communicating the output of the infrared detector element directly from the infrared detector element to a magneto-optical modulator comprises communicating the output of the infrared detector element directly from the infrared detector element to a ferromagnetic magneto-optical rod comprised of gallium doped YAG.

* * * * *